(12) United States Patent
Wang et al.

(10) Patent No.: US 7,489,755 B2
(45) Date of Patent: Feb. 10, 2009

(54) METHOD AND APPARATUS FOR TRANSMISSION AND RECEPTION OF DATA

(75) Inventors: Fan Wang, Vernon Hills, IL (US); Amitava Ghosh, Buffalo Grove, IL (US); Chandrasekar Sankaran, Arlington Heights, IL (US); Jun Tan, Dearborn Heights, MI (US)

(73) Assignee: Motorola, Inc., Schaumburg, IL (US)

( * ) Notice: Subject to any disclaimer, the term of this patent is extended or adjusted under 35 U.S.C. 154(b) by 502 days.

(21) Appl. No.: 11/054,290

(22) Filed: Feb. 9, 2005

(65) Prior Publication Data
US 2006/0176936 A1    Aug. 10, 2006

(51) Int. Cl.
*H04L 7/00* (2006.01)

(52) U.S. Cl. .................... 375/363; 375/134; 375/135; 375/136; 375/137; 375/145; 375/146; 375/147; 375/246; 375/253; 375/342; 375/365; 375/366; 375/367; 375/370; 375/265

(58) Field of Classification Search ......... 375/134–137, 375/145–147, 246, 253, 324, 342, 363, 365–367, 375/370
See application file for complete search history.

(56) References Cited

U.S. PATENT DOCUMENTS

| | | | |
|---|---|---|---|
| 6,493,395 B1 * | 12/2002 | Isaksson et al. | 375/261 |
| 6,952,394 B1 | 10/2005 | Kim et al. | |
| 6,961,388 B2 * | 11/2005 | Ling et al. | 375/267 |
| 2001/0028637 A1 * | 10/2001 | Abeta et al. | 370/335 |
| 2004/0085892 A1 | 5/2004 | Walton et al. | |
| 2004/0136314 A1 * | 7/2004 | Jung et al. | 370/203 |
| 2004/0228267 A1 * | 11/2004 | Agrawal et al. | 370/203 |
| 2004/0233838 A1 * | 11/2004 | Sudo et al. | 370/208 |
| 2006/0092825 A1 * | 5/2006 | Kim et al. | 370/206 |

FOREIGN PATENT DOCUMENTS

| | | |
|---|---|---|
| EP | 1370018 A1 | 12/2003 |
| JP | 2003304218 | 10/2003 |
| WO | 02087182 A1 | 10/2002 |
| WO | 03034645 A1 | 4/2003 |

OTHER PUBLICATIONS

3GPP2 C.S0054-0: CDMA2000 High Rate Broadcast-Multicast Packet Data Air Interface Specification.
C30-20040607-060 Qualcomm: Enhance Broadcast-Multicast for HRPD.

(Continued)

*Primary Examiner*—Shuwang Liu
*Assistant Examiner*—Kabir A Timory

(57) ABSTRACT

Various embodiments are described to provide for the transmission and reception of data in an improved manner. Data transmission is improved by including in a transmitter a null generator (110) to generate an output data symbol sequence that exhibits nulls in the frequency domain at particular frequencies that an input data symbol sequence does not. A pilot inserter (120) then adds a pilot symbol sequence to this output data symbol sequence to create a combined symbol sequence. Since the pilot symbol sequence exhibits pilot signals corresponding to the nulls of the output data symbol sequence in the frequency domain, the combined symbol sequence exhibits pilots that are orthogonal to the data in the frequency domain.

17 Claims, 6 Drawing Sheets

OTHER PUBLICATIONS

C30-20041206-0xx Qualcomm: Updates to the Enhanced HRPD Broadcast Proposal.

C30-20031006-0xx Qualcomm: Response to actions items on Qualcomm's Enhanced Broadcast Multicast Proposal.

C30-20041019-001 TI: A backward compatible CDMA-based enhanced broadcast multicast (EBM) system for HRPD.

C30-20041206-022 TI: Derivation of Channel Estimation Error Model for CDMA EBMEvaluation Methodology.

C30-20040823-018 KDDI: Simulation of cdma2000 1xEV-DO forward link performance using frequency domain equalizer.

D. Falconer, S.L. Ariyavisitakul, S. Benyamin-Seeyar, and B. Eldson: Frequency Domain Equalization for Single-Carrier Broadband Wireless Systems, IEEE Comm. Magazine, Apr. 2002.

R. Negi and J. Cioffi: Pilot Tone Selection for Channel Estimation in a Mobile OFDM System, IEE Tran. Consumer Elec., Aug. 1998.

D.C. Chu: "Polyphase codes with good periodic correlation properties", IEE Trans. On Information Theory, Jul. 1972.

Bateman, AJ et al: "Phase-Locked Transparent Tone-in-Band(TTIP): A New Spectrum Configuration Particularly Suited to the Transmission of Data Over SSB Mobile Radio Networks", IEEE Transactions on Communications, Jan. 1, 1984, pp. 81-87, IEEE Service Center, Piscataway, NJ, US.

* cited by examiner

METHOD AND APPARATUS FOR TRANSMISSION AND RECEPTION OF DATA

FIELD OF THE INVENTION

The present invention relates generally to data communications, and in particular, to a method and apparatus for transmission and reception of data within such communication systems.

BACKGROUND OF THE INVENTION

At present, 3GPP2 (3rd Generation Partnership Project 2) is considering proposals using single frequency networks (SFN) for enhancing the "CDMA2000 High Rate Broadcast-Multicast Packet Data Air Interface Specification" (3GPP2 C.50054-0/ TIA-1006) to provide higher data rates to users. (3GPP2 may be contacted via www.3gpp2.com.) In the enhancement, one or multiple sites transmit the same broadcast contents at the same time. With enhanced receivers, the broadcast signals from different base transceiver stations (BTSs) can be effectively combined. The proposals under consideration include: "Enhanced Broadcast-Multicast for HRPD" (C30-20040607-060), "Updates to the Enhanced HRPD Broadcast Proposal" (C30-20041206-0xx), "Response to actions items on Qualcomm's Enhanced Broadcast Multicast Proposal" (C30-20031006-0xx), "A backward compatible CDMA-based enhanced broadcast multicast (EBM) system for HRPD" (C30-20041019-011), and "Derivation of Channel Estimation Error Model for CDMA EBM Evaluation Methodology" (C30-20041206-022).

Each of these proposals provide increased data rates along with some (but not all) additional advantages that include backwards compatibility with existing High Rate Packet Data (HRPD)/1XEV-DO (DO) transceivers, no inter-block interference, an FDM (frequency division multiplexed) pilot orthogonal to the data symbols, a single receiver which can handle a unicast and efficient broadcast service, and a simple channel estimator. Since none of the present proposals provide all of these advantages in a single solution, it would be desirable to have a method and apparatus for providing enhanced broadcast-multicast service (BCMCS) that was able to provide all of these advantages.

Specific embodiments of the present invention are disclosed below with reference to FIGS. 1-7. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to provide for the transmission and reception of data in an improved manner. Data transmission is improved by including in a transmitter a null generator to generate an output data symbol sequence that exhibits nulls in the frequency domain at particular frequencies that an input data symbol sequence does not. A pilot inserter then adds a pilot symbol sequence to this output data symbol sequence to create a combined symbol sequence. Since the pilot symbol sequence exhibits pilot signals corresponding to the nulls of the output data symbol sequence in the frequency domain, the combined symbol sequence exhibits pilots that are orthogonal to the data in the frequency domain.

Figure 1:
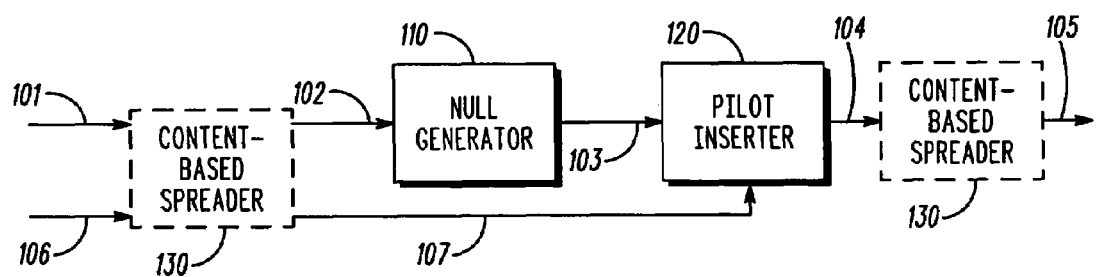
FIG. 1 is a block diagram depiction of transmitter components in accordance with multiple embodiments of the present invention.

Operation of embodiments in accordance with the present invention occurs substantially as follows with reference to FIGS. 1-7. FIG. 1 is a block diagram depiction of transmitter components in accordance with multiple embodiments of the present invention. FIG. 1 depicts null generator 110, pilot inserter 120, and content-based spreader 130. Depending on the embodiment, content-based spreader 130 may be located (i) before null generator 110, (ii) after pilot inserter 120, or (iii) not included at all. For embodiments where (ii) and (iii) apply, input data symbol sequence 102 is identical to input data symbol sequence 101, and pilot symbols 106 are identical to pilot symbols 107.

Null generator 110 creates output data symbol sequence 103 from input data symbol sequence 102. As compared to input sequence 102, output sequence 103 exhibits nulls in the frequency domain at particular frequencies that input sequence 102 does not. Moreover, if each input data symbol (in sequence 102) is independent of each other and has the same variance, the variance of each output data symbol (in sequence 103) will be the same.

Pilot inserter 120 then adds a pilot symbol sequence to output data symbol sequence 103 to create combined symbol sequence 104. The pilot symbol sequence comprises pilot symbols 107, which are block repeated as required. In the end, the pilot symbol sequence should exhibit pilot signals in the frequency domain that correspond to the nulls of the output data symbol sequence. Therefore, the pilot signals will replace the nulls when the sequences are added.

Figure 4:
FIG. 4 is a block diagram depiction of pilot insertion in accordance with multiple embodiments of the present invention.
Figure 4:
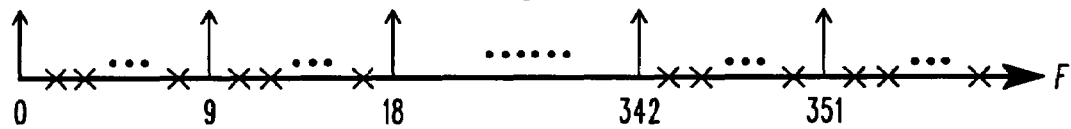
Figure 4:
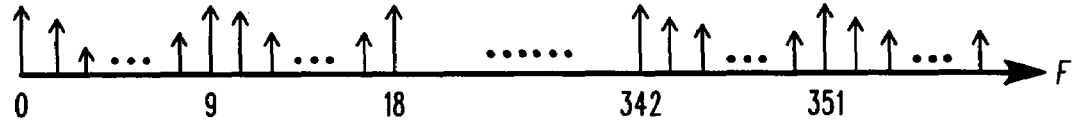

For example, FIG. 4 is a block diagram depiction of pilot insertion in accordance with multiple embodiments of the present invention. In particular, FIG. 4 illustrates a situation in which the output data symbol sequence has 360 symbols and there are 40 reference symbols. The pilot symbol sequence is generated by repeating the 40 reference symbol sequence 9 times. The frequency response of the pilot sequence (320 pilot symbols) can be calculated by the discrete Fourier transform (DFT):

$$f_p[n] = \sum_{m=0}^{8} \sum_{k=0}^{39} p_k e^{-j2\pi \frac{(m*40+k)n}{360}},$$

$$n = 0, \ldots 359$$

It can be easily verified that the pilot frequency response is zero on all frequencies except subcarriers n=0, 9, 18, ..., 351 (total 40 points), i.e., $$f_p[n] = \begin{cases} 9 \sum_{k=0}^{39} p_k e^{-j2\pi \frac{kn}{360}} & n = 0, 9, 18, \ldots 351 \\ 0 & \text{otherwise} \end{cases}$$

Pilot insertion 410 depicts the symbol-by-symbol addition of the output data symbol sequence and the pilot symbol sequence in the time domain, while pilot insertion 420 depicts the corresponding addition in the frequency domain. Pilot insertion result 430 depicts the combined symbol sequence with pilot signals on subcarriers 0, 9, 18, ..., and 351, which correspond to the nulls in the frequency response of the output data symbol sequence.

For embodiments in which content-based spreader 130 is located after pilot inserter 120, spreader 130 modifies combined symbol sequence 104 to shift the pilot signals to particular subcarriers in the frequency domain according to what content the combined symbol sequence is conveying. In other words, different content is shifted different amounts. To provide an example, content-based spreading may be accomplished using a modulation sequence as follows:

$$\exp(j\Phi_k n), n=0, 1, \ldots 359$$

where $$\Phi_k = 2\pi \frac{k}{360},$$

k=0, 1, ... 8 corresponds to the k-th content. Therefore, if the pilot signals of combined symbol sequence 104 are on subcarriers 0, 9, 18, ..., and 351, the pilot signals of symbol sequence 105 may be shifted to subcarriers 2, 11, 20, ..., and 353 in the case where content k=3 is being conveyed $$\left(\Phi_k = 2\pi \frac{2}{360}\right).$$

With multiple contents being transmitted by neighboring cells, using the modulation sequence above for different contents can aid in unbiased pilot detection and can reduce the interference in channel estimation.

For embodiments in which content-based spreader 130 is located before null generator 110, spreader 130 spreads input data symbol sequence 101 and pilot symbols 106 using a particular code division multiple access (CDMA) long spreading code according to what content the input data symbol sequence is conveying. In other words, a different spreading code sequence is used for different content. Spreaded symbol sequences 102 and 107 are otherwise processed as described above.

Figure 2:
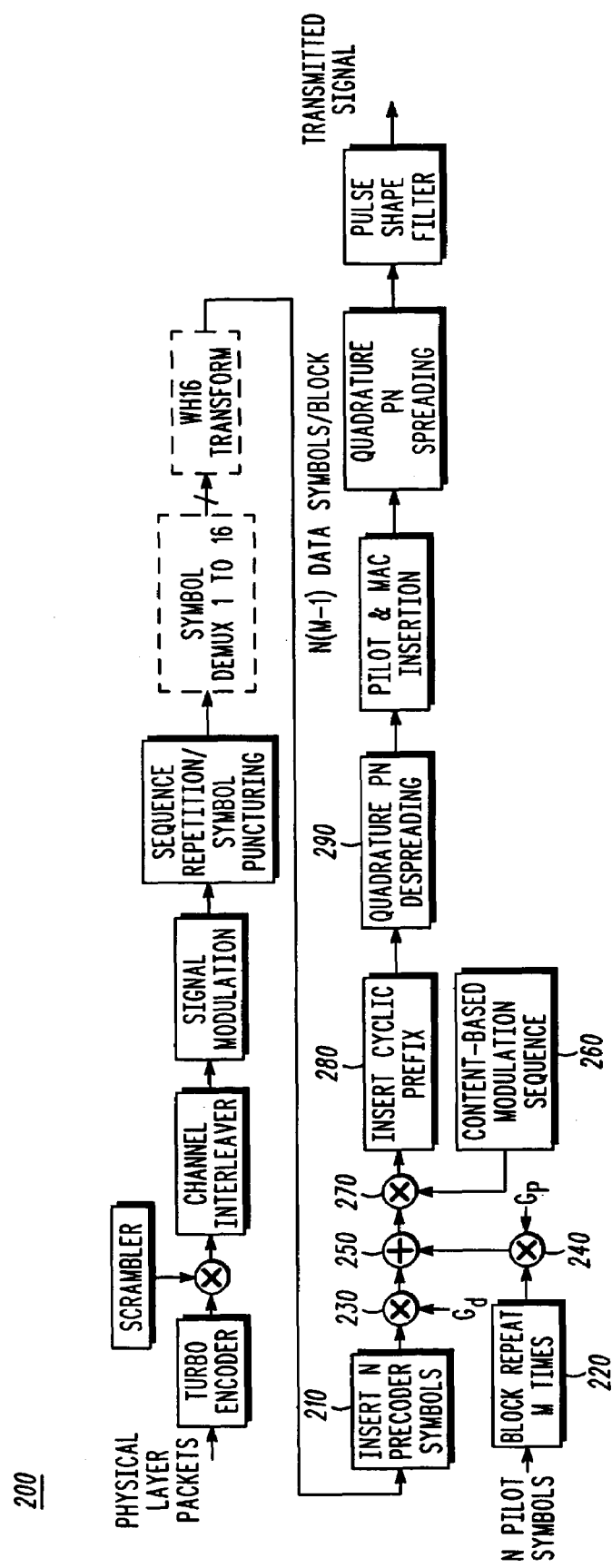
FIG. 2 is a block diagram depiction of a modified High Rate Packet Data (HRPD)/1XEV-DO (DO) transmitter in accordance with multiple embodiments of the present invention.
Figure 3:
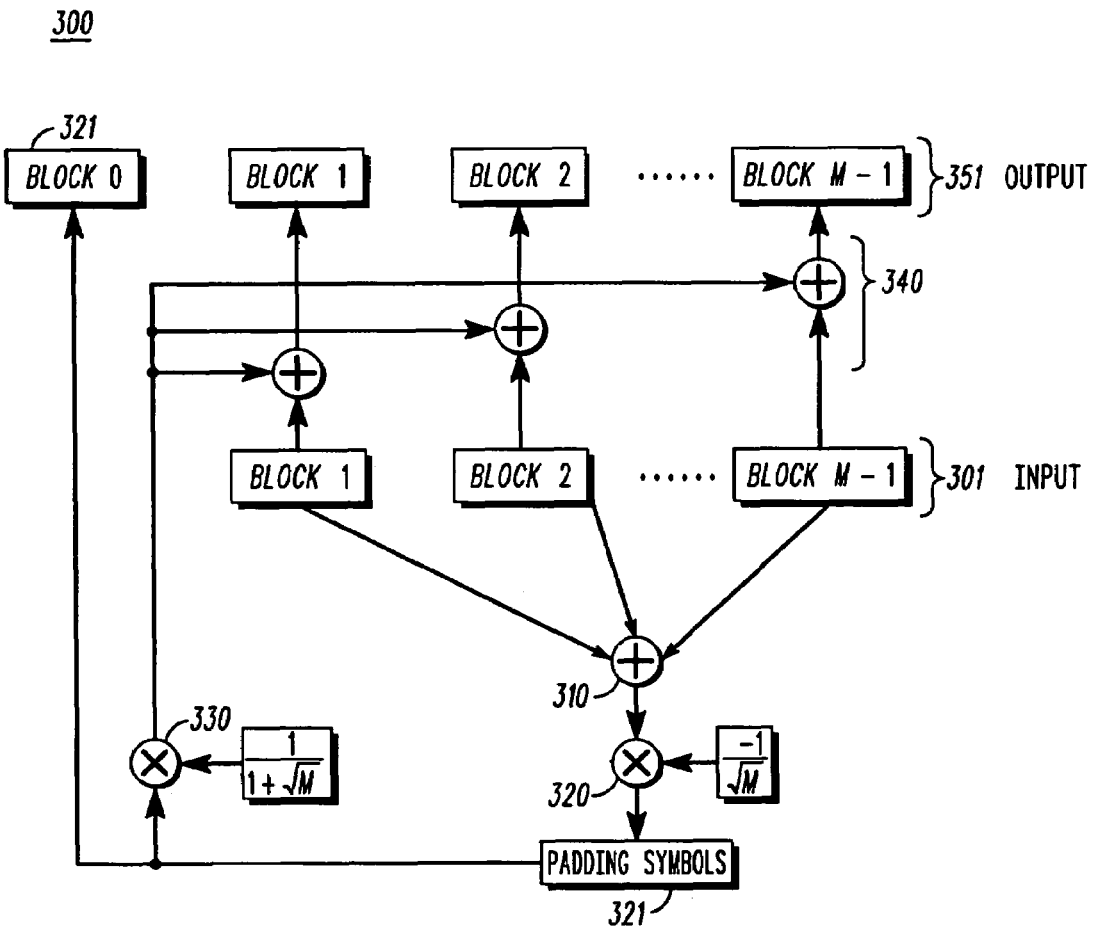
FIG. 3 is a block diagram depiction of a null generator in accordance with multiple embodiments of the present invention.

FIG. 2 is a block diagram depiction of a modified High Rate Packet Data (HRPD)/1XEV-DO (DO) transmitter in accordance with multiple embodiments of the present invention. As depicted in FIG. 2, components 210, 220, 230, 240, 250, 260, 270, 280, and 290 have been added to a prior-art HRPD/DO transmitter. Also, transmitter 200 has been depicted in a generic form in order to cover at least the three following configurations:

| Data Tones N(M – 1) | Pilot Tones N | M |
|---|---|---|
| 320 | 40 | 9 |
| 324 | 36 | 10 |
| 256 | 64 | 5 |

Generally, M*N subcarriers are used to transmit pilot and data. Among the M*N subcarriers, N evenly spaced subcarriers are allocated for pilot, and N(M−1) subcarriers are allocated for data.

As in an HRPD/DO transmitter, the physical layer packets to be transmitted by transmitter 200 are encoded by a channel encoder, interleaved by an interleaver, modulated by a modulator, and spread by a spreader to produce an input data symbol sequence. This symbol sequence serves as input to symbol inserter 210, which is a type of null generator such as that depicted in FIG. 3.

Null generator 300 allocates N evenly spaced subcarriers for pilots and N(M−1) subcarriers for data. Each block contains N symbols, and as depicted, null generator 300 generates N padding symbols. In detail, adder 310 linearly adds together symbols having the same position in their respective groups/blocks of input data symbol sequence 301. Normalizer 320 scales the result by a first normalization factor to produce padding symbols 321. Normalizer 330 scales padding symbols 321 by a second normalization factor to produce normalized padding symbols. Adder 340 linearly adds to each symbol from input data symbol sequence 301 a symbol having the same position in the normalized padding symbols as shown. Padding symbols 321 are appended as block 0 to the result of adder 340, creating output data symbol sequence 351. This is the output of null generator 300.

Generally, output data symbol sequence 351 has some noteworthy properties. First, the variance of each symbol of output data symbol sequence 351 is identical if each symbol of input data symbol sequence 301 is independent and has an identical variance. For example, if the 320 input data symbols have a normalized variance of 1, the corresponding 360 output symbols will have a variance of 8/9. This property guarantees that the peak-to-average power ratio of the transmitted signal will be relatively low. Second, (again the example of 360 output symbols is assumed) the output symbols satisfy:

$$\sum_{m=0}^{8} s_{m*40+k} = 0,$$

$$k = 0, 1, \ldots 39$$

Thus the frequency response of the output data signal has nulls on subcarriers n=0, 9, 18, . . . , and 351 (40 total points):

$$f_d[n] = \sum_{k=0}^{39} \left( \sum_{m=0}^{8} s_{m*40+k} \right) e^{-j2\pi \frac{kn}{360}} = 0,$$

$$n = 0, 9, 18, \ldots 351$$

Returning to FIG. 2, the output of symbol inserter 210 is scaled by data gain adjuster 230. Block repeater 220, pilot gain adjust 240, and adder 250 correspond to a pilot inserter such as that described above with respect to FIGS. 1 and 4. Similarly, content-based modulation sequence 260 and spreader 270 correspond to a content-based spreader such as that described above with respect to FIG. 1. In addition to content-based spreading, transmitter 200 also includes cyclic prefix inserter 280. Insertion of a cyclic prefix serves to remove inter block interference and provide cyclic convolution of the channel response and transmitted signal. Lastly, quadrature PN despreader 290 is the final addition to a known HRPD/DO transmitter included in the embodiments represented by transmitter 200. Thus, transmitter 200 is an exemplary illustration of embodiments of the present invention implemented through modifications to known HRPD/DO transmitters.

Figure 5:
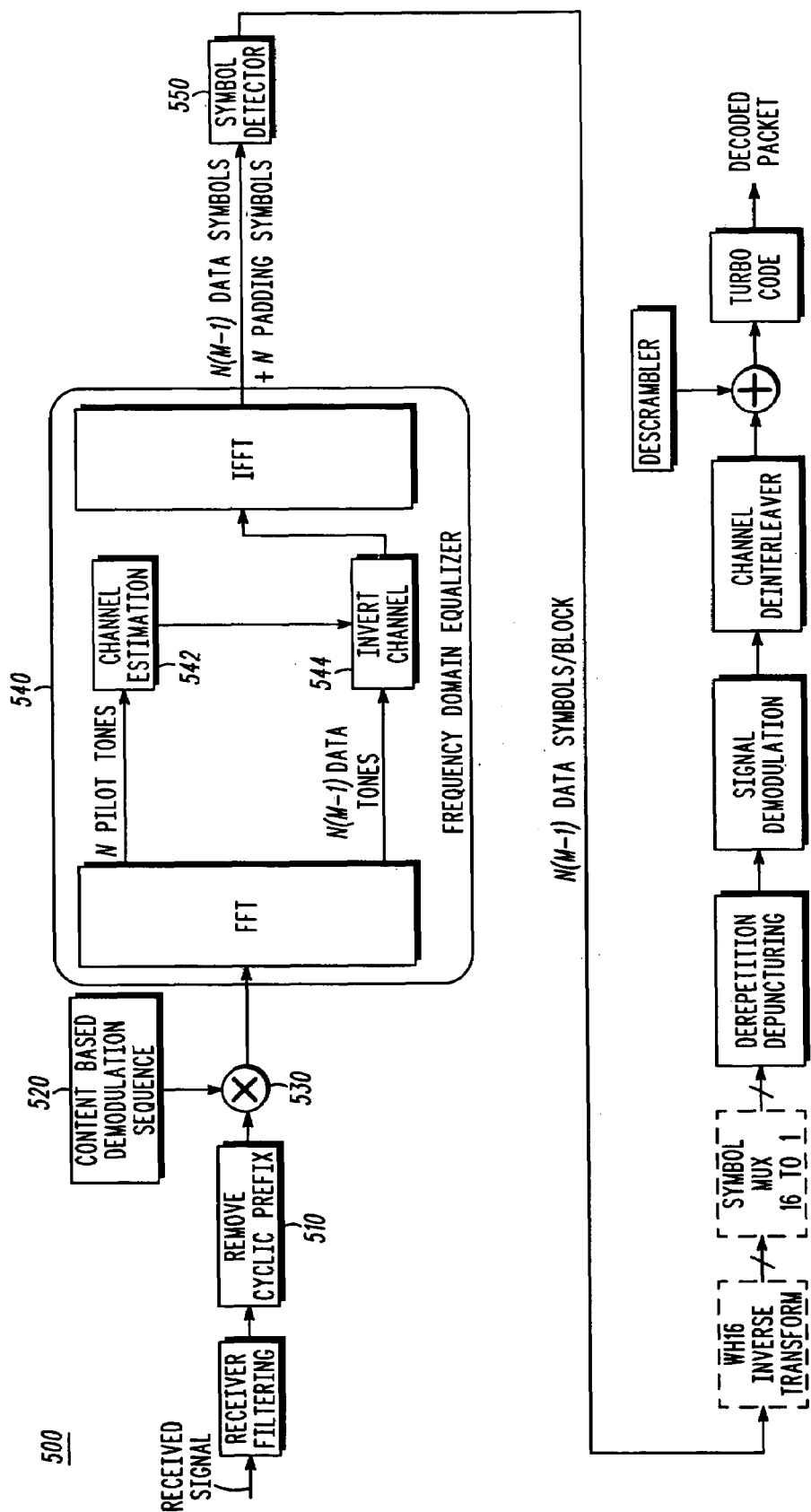
FIG. 5 is a block diagram depiction of receiver components in accordance with multiple embodiments of the present invention.

FIG. 5 is a block diagram depiction of receiver components in accordance with multiple embodiments of the present invention. As with the transmitter of FIG. 2, receiver 500 is an exemplary illustration of embodiments of the present invention implemented through modifications to known HRPD/DO receivers. As depicted in FIG. 5, components 510, 520, 530, 540, and 550 have been added to a prior-art HRPD/DO receiver. Also, receiver 500 has been depicted in a generic form in order to cover the configurations based on M and N values that transmitter 200 supports.

In general, cyclic prefix remover 510 removes the cyclic prefix from a first receiver symbol sequence to produce a second receiver symbol sequence. A content-based demodulator (i.e., content-based modulation sequence 520 and despreader 530) then restores pilot and data signals in the second receiver symbol sequence to designated subcarriers in the frequency domain to produce a received symbol sequence. Frequency domain equalizer (FDE) 540 then recovers an equalized data symbol sequence from the received symbol sequence, which exhibits pilots at specific subcarriers in the frequency domain.

FDE 540 comprises channel estimator 542 that produces channel estimates from the known transmitted pilots and the received symbol sequence pilots, obtained from their specific subcarriers. FDE 540 also comprises equalizer 544 that generates the equalized data symbol sequence in the time domain using the received symbol sequence and the channel estimates. Depending on the embodiment, equalizer 544 may generate the equalized data symbol sequence by inversing a channel frequency response (zero forcing) or by minimizing the mean square of the equalization error (MMSE). Symbol detector 550 then modifies the equalized data symbol sequence in the time domain to create an output data symbol sequence. Finally, in accordance with an HRPD/DO receiver, this output data symbol sequence is further processed to obtain decoded data by a despreader, a demodulator, a deinterleaver, and a channel decoder.

A more detailed description of key receiver 500 components follows with respect to a receive configuration where N=40 and M=9 (i.e., having 320 data symbols and 40 pilot symbols/block). Given the transmitter of FIG. 2, the transmitted signal can be presented as $$\underbrace{\begin{bmatrix} s_0 \\ s_1 \\ \vdots \\ \vdots \\ s_{359} \end{bmatrix}}_{S(360 \times 1)} = G_d \underbrace{\left( \begin{bmatrix} -1/3I_{40} & -1/3I_{40} & \cdots & -1/3I_{40} \\ I_{40} & 0 & \cdots & 0 \\ 0 & \ddots & \ddots & \vdots \\ \vdots & \ddots & \ddots & 0 \\ 0 & \cdots & 0 & I_{40} \end{bmatrix} + \begin{bmatrix} 0 & 0 & \cdots & 0 \\ -1/12I_{40} & -1/12I_{40} & \cdots & -1/12I_{40} \\ -1/12I_{40} & \ddots & \ddots & \vdots \\ \vdots & \ddots & \ddots & -1/12I_{40} \\ -1/12I_{40} & \cdots & -1/12I_{40} & -1/12I_{40} \end{bmatrix} \right)}_{H(360 \times 320)} \underbrace{\begin{bmatrix} d_0 \\ \vdots \\ \vdots \\ d_{319} \end{bmatrix}}_{D(320 \times 1)},$$

where $I_{40}$ is an identity matrix with dimension of 40, D is a vector of information data, and the transmitted data block S includes 40 padding symbols. In the following, it is assumed the information symbols have been normalized, that is $$E(DD^*) = I_{320}$$

After removing the cyclic prefix, the received signal through a fading channel can be presented as $$R = \underbrace{F^* \Omega F}_{cyclic\ convolution} S + N_0 = \underbrace{G_d F^* \Omega F H D}_{T} + N_0$$

where F is the normalized Fourier transform matrix, i.e., $F^*F = I$. $\Omega = \text{diag}\{\omega_0, \ldots, \Omega_{360}\}$ is a diagonal matrix, with the diagonal terms corresponding to the channel frequency response on each of the subcarriers. In the following, we assume the noise $N_0$ is a white noise random process, and $E(N_0 N_0^*) = \sigma_0^2 I$.

For zero forcing embodiments, the zero forcing receiver is $$\hat{D} = (T^*T)^{-1} T^* R$$

Since $$T = G_d F^* \Omega F H$$

we have $$T^*T = G_d^2 H^* F^* \Omega^* \Omega F H$$

The rows 1, 10, 19, ..., and 352 of the matrix FH correspond to the frequency response on the 0, 9, ..., and 351 subcarriers of the transmitted data sequence. Thus, we have $$(FH)_{(i)} = [0, \ldots 0], i = 0, 9, \ldots 351$$

where $(FH)_{(i)}$ is the $(i+1)$-th row of the matrix FH. E denotes an elementary transform matrix which rearranges the rows of the matrix FH. Thus $$EFH = \begin{bmatrix} (FH)_0 \\ (FH)_9 \\ \vdots \\ (FH)_{351} \\ (FH)_1 \\ \vdots \\ (FH)_8 \\ \vdots \\ (FH)_{360} \end{bmatrix} = \begin{bmatrix} 0 \\ 0 \\ \vdots \\ 0 \\ (FH)_1 \\ \vdots \\ (FH)_8 \\ \vdots \\ (FH)_{360} \end{bmatrix} = \begin{bmatrix} 0 \\ M \end{bmatrix}$$

Since E is an elementary transform matrix, it follows that $E^T E = I$ and $$E\Omega^* \Omega E^T = diag\{0, \cdots, 0, |\omega_1|^2, \ldots, |\omega_8|^2, |\omega_{10}|^2 \ldots, |\omega_{360}|^2\} = \begin{bmatrix} 0 & \\ & \Omega_d^* \Omega_d \end{bmatrix}$$

Thus $$T^*T = G_d^2 H^* F^* \Omega_d^* \Omega_d FH = G_d^2 M^* \Omega_d^* \Omega_d M$$

With a direct calculation, it can be verified that $H^*H = M^*M = I$. Therefore $$(T^*T)^{-1}T^* = (G_d)^{-1} M^* (\Omega_d^* \Omega_d)^{-1} M [0 \quad M^* \Omega_d^*] EF$$

$$= (G_d)^{-1} [0 \quad M^*] \begin{bmatrix} * \\ (\Omega_d^* \Omega_d)^{-1} \Omega_d^* \end{bmatrix} EF$$

$$= (G_d)^{-1} H^* F^* diag\left\{ *, \frac{\omega_1^*}{|\omega_1|^2}, \ldots, \frac{\omega_8^*}{|\omega_8|^2}, *, \frac{\omega_{10}^*}{|\omega_{10}|^2}, \ldots, \frac{\omega_{360}^*}{|\omega_{360}|^2} \right\} F$$

In sum, zero forcing receiver embodiments of the present invention may be directly based on a zero forcing frequency domain equalizer (ZF-FDE). Note that in a zero forcing equalizer, the equalized channel gains on sub channels 0, 9, ..., and 351 do not affect the equalizer output, since the transmitted data signal is not allocated to the subchannels 0, 9, ..., and 351 through the transform H at the transmitter. Thus, the optimized receiver should not collect information on the sub channels 0, 9, ..., and 351 to avoid collecting unnecessary noise and interference. This frequency selecting operation is implemented through the transform H* at the receiver.

The derivation of the MMSE receiver follows the same line as the derivation of the zero forcing receiver above. The MMSE estimation of the transmitted signal is $$\hat{D} = (T^*T + \sigma_0^2 I)^{-1} T^* R \text{ and}$$

$$(T^*T + \sigma_0^2 I)^{-1} T^* = (G_d)^{-1} H^* F^* diag\left\{ *, \frac{\omega_1^*}{|\omega_1|^2 + \sigma_0^2}, \ldots, \frac{\omega_8^*}{|\omega_8|^2 + \sigma_0^2}, *, \frac{\omega_{10}^*}{|\omega_{10}|^2 + \sigma_0^2}, \ldots, \frac{\omega_{360}^*}{|\omega_{360}|^2 + \sigma_0^2} \right\} F$$

In sum, MMSE receiver embodiments of the present invention may be directly based on the MMSE frequency domain equalizer (MMSE-FDE). As with the zero forcing receiver, the equalized channel gains on sub channels 0, 9, ..., 351 do not affect the equalizer output.

Figure 6:
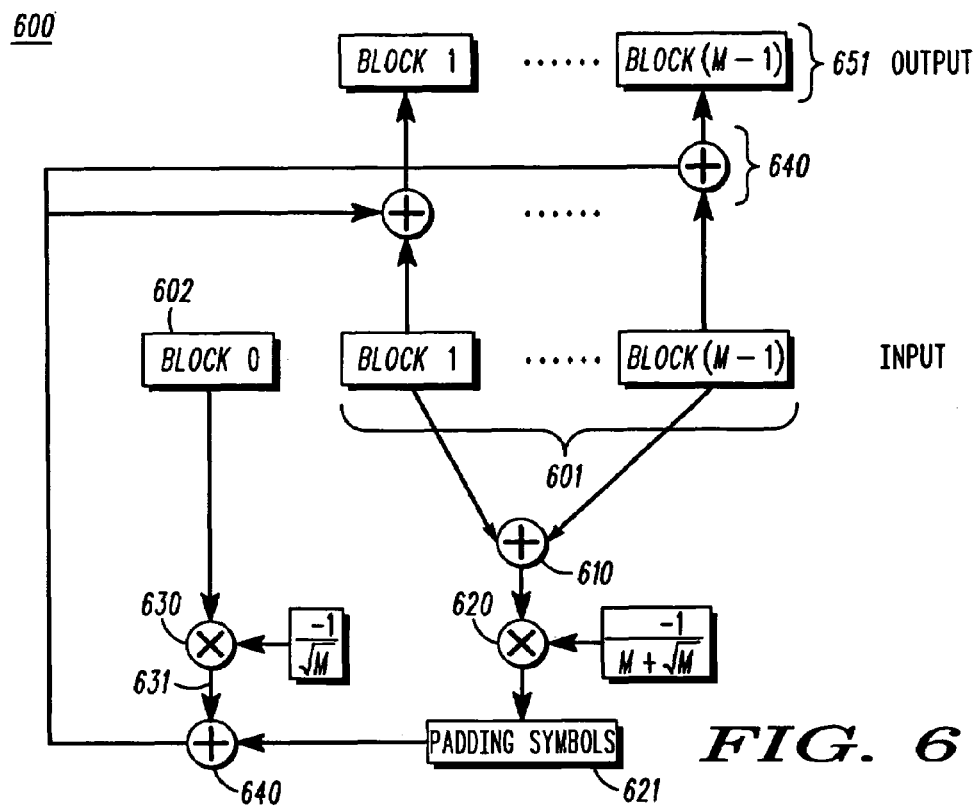
FIG. 6 is a block diagram depiction of a symbol detector in accordance with multiple embodiments of the present invention.

Symbol detector 550, for either the zero forcing or MMSE embodiments, is a type of symbol detector such as that depicted in FIG. 6. Adder 610 linearly adds together symbols having the same position in their respective end group (of end groups 601, which together with first group 602 make up the inputted equalized data symbol sequence). Each symbol of this sum is scaled by normalizer 620 to produce estimated padding symbols 621. Normalizer 630 scales each symbol of first group 602 by a normalization factor to produce estimated padding symbols 631. Adder 640 then linearly adds to each symbol, from an end group of the plurality of end groups 601, a symbol from the estimated padding symbols 621 and a symbol from the estimated padding symbols 631, all having the same respective group positions. The result of adder 640 then is output data symbol sequence 651. As mentioned above with respect to FIG. 5, the output data symbol sequence of symbol detector 550 is further processed to obtain decoded data by a despreader, a demodulator, a deinterleaver, and a channel decoder.

Figure 7:
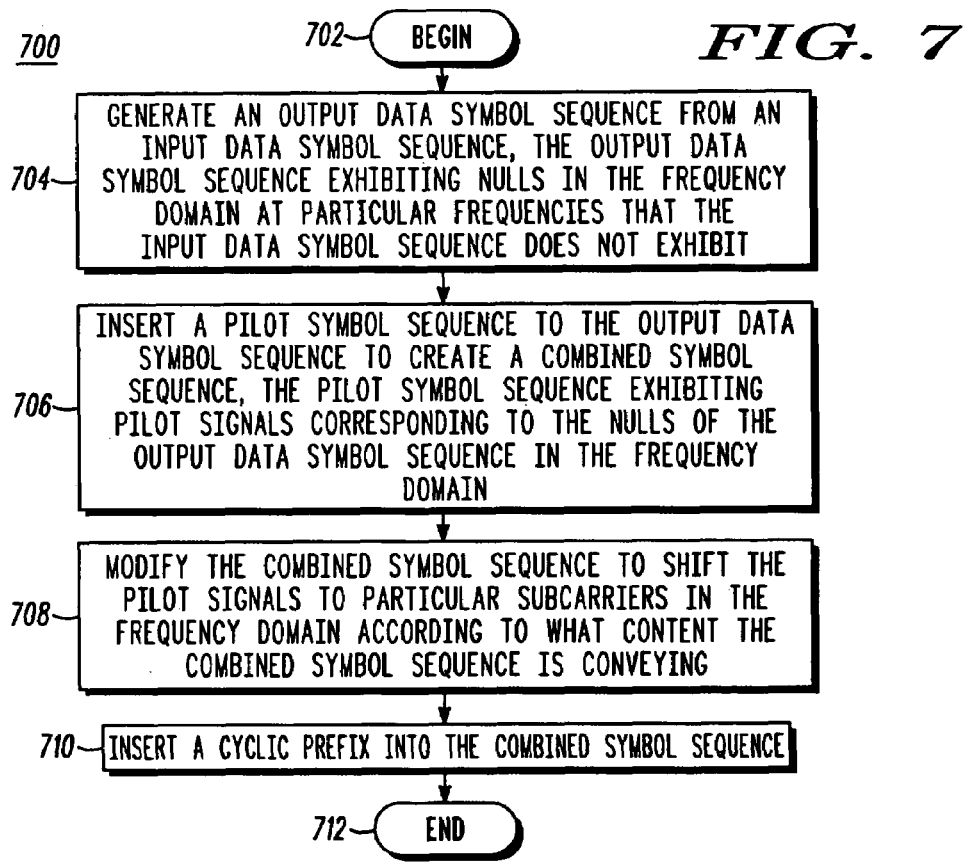
FIG. 7 is a logic flow diagram illustrating functionality performed in transmitting data in accordance with multiple embodiments of the present invention.

FIG. 7 is a logic flow diagram illustrating functionality performed in transmitting data in accordance with multiple embodiments of the present invention. Logic flow 700 begins (702) with the generation (704) of an output data symbol sequence from an input data symbol sequence, where the output data symbol sequence exhibits nulls in the frequency domain at particular frequencies that the input data symbol sequence does not. A pilot symbol sequence, which exhibits pilot signals corresponding to the nulls of the output data symbol sequence, is then inserted (706) into the output data symbol sequence to create a combined symbol sequence. This combined symbol sequence is then modified (708) to shift the pilot signals to particular subcarriers in the frequency domain according to what content the combined symbol sequence is conveying. A cyclic prefix is also inserted (710) into the combined symbol sequence before logic flow 700 ends (712). Depending on the particular embodiment of the present invention, functionality not depicted in FIG. 7 may be additionally performed while functionality depicted may not be performed in order to effect the transmission of data.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language).

What is claimed is:

1. An apparatus comprising:
   a null generator for generating an output data symbol sequence from an input data symbol sequence, wherein the output data symbol sequence exhibits nulls in a frequency domain at particular frequencies that the input data symbol sequence does not exhibit;
   a pilot inserter for adding a pilot symbol sequence to the output data symbol sequence to create a combined symbol sequence, wherein the pilot symbol sequence exhibits pilot signals corresponding to the nulls of the output data symbol sequence in the frequency domain, wherein the null generator comprises:
   a first adder for linearly adding together symbols having the same position in their respective groups to generate a group of symbols, wherein the groups are subgroups of the input data symbol sequence;
   a first normalizer for scaling each symbol of the group of symbols by a normalization factor to produce a group of padding symbols used to generate the output data symbol sequence.

2. The apparatus of claim 1 further comprising
   a content-based spreader for modifying the combined symbol sequence to shift the pilot signals to particular subcarriers in the frequency domain according to what content the combined symbol sequence is conveying.

3. The apparatus of claim 1 further comprising
   a content-based spreader for spreading the input data symbol sequence and the pilot symbol sequence using a particular code division multiple access (CDMA) long spreading code according to what content the input data symbol sequence is conveying.

4. The apparatus of claim 1 further comprising
   a cyclic prefix inserter for inserting a cyclic prefix into the combined symbol sequence.

5. The apparatus of claim 1 wherein the null generator further comprises:
   a second normalizer for scaling each symbol of the group of padding symbols by a normalization factor to produce a group of normalized padding symbols;
   a second adder for linearly adding to each symbol from the input data symbol sequence a symbol having the same position in the group of normalized padding symbols as that symbol has in its subgroup to produce a summed symbol sequence, wherein the output data symbol sequence is the group of padding symbols appended to the summed symbol sequence.

6. The apparatus of claim 1 further comprising:
   a channel encoder for encoding data packets to produce a sequence of encoded symbols;
   an interleaver for interleaving the sequence of encoded symbols to produce a sequence of interleaved symbols;
   a modulator for modulating the sequence of interleaved symbols to produce a sequence of modulated symbols; and
   a spreader for spreading the sequence of modulated symbols to produce the input data symbol sequence.

7. A method comprising:
   generating an output data symbol sequence from an input data symbol sequence, wherein the output data symbol sequence exhibits nulls in a frequency domain at particular frequencies that the input data symbol sequence does not exhibit;
   inserting a pilot symbol sequence into the output data symbol sequence to create a combined symbol sequence, wherein the pilot symbol sequence exhibits pilot signals corresponding to the nulls of the output data symbol sequence in the frequency domain,
   wherein generating the output data symbol sequence comprises:
   linearly adding together symbols having the same position in their respective groups to generate a group of symbols, wherein the groups are subgroups of the input data symbol sequence;
   scaling each symbol of the group of symbols by a normalization factor to produce a group of padding symbols used to generate the output data symbol sequence.

8. The method of claim 7 further comprising
   modifying the combined symbol sequence to shift the pilot signals to particular subcarriers in the frequency domain according to what content the combined symbol sequence is conveying.

9. The method of claim 7 further comprising
   spreading the input data symbol sequence and the pilot symbol sequence using a particular code division multiple access (CDMA) long spreading code according to what content the input data symbol sequence is conveying.

10. The method of claim 7 further comprising inserting a cyclic prefix into the combined symbol sequence.

11. The method of claim 7, wherein generating the output data symbol sequence further comprises:
    scaling each symbol of the group of padding symbols by a normalization factor to produce a group of normalized padding symbols;
    linearly adding to each symbol from the input data symbol sequence a symbol having the same position in the group of normalized padding symbols as that symbol has in its subgroup to produce a summed symbol sequence, wherein the output data symbol sequence is the group of padding symbols appended to the summed symbol sequence.

12. The method of claim 7 further comprising:
    encoding data packets to produce a sequence of encoded symbols;
    interleaving the sequence of encoded symbols to produce a sequence of interleaved symbols;
    modulating the sequence of interleaved symbols to produce a sequence of modulated symbols; and
    spreading the sequence of modulated symbols to produce the input data symbol sequence.

13. An apparatus comprising:
    a frequency domain equalizer for recovering an equalized data symbol sequence from a received symbol sequence, wherein the received symbol sequence exhibits pilots at specific subcarriers in a frequency domain, the frequency domain equalizer comprising:
    a channel estimator for producing channel estimates from known transmitted pilots and pilots in the received symbol sequence, wherein the pilots in the received symbol sequence are obtained from specific sub-carriers in the frequency domain, and an equalizer for generating the equalized data symbol sequence in the time domain using the received symbol sequence and the channel estimates;

a symbol detector for modifying the equalized data symbol sequence in the time domain to create an output data symbol sequence, wherein the symbol detector comprises:

a first adder for linearly adding together symbols having the same position in their respective end group to generate a group of symbols, wherein a first group and a plurality of end groups are subgroups of the equalized data symbol sequence;

a first normalizer for scaling each symbol of the group of symbols by a normalization factor to produce a first group of estimated padding symbols;

a second normalizer for scaling each symbol of the first group by a normalization factor to produce a second group of estimated padding symbols;

a second adder for linearly adding to each symbol from an end group of the plurality of end groups a symbol from the first group of estimated padding symbols that has the same group position as that symbol in its end group and a symbol from the second group of estimated padding symbols that has the same group position as that symbol in its end group, wherein the second adder thereby produces the output data symbol sequence.

14. The apparatus of claim 13 further comprising:

a cyclic prefix remover for removing a cyclic prefix from a first receiver symbol sequence to produce a second receiver symbol sequence;

a content-based demodulator for restoring pilot and data signals in the second receiver symbol sequence to designated subcarriers in the frequency domain to produce the received symbol sequence.

15. The apparatus of claim 13, further comprising:

a despreader for despreading the output data symbol sequence to produce a sequence of despreaded symbols;

a demodulator for demodulating the sequence of despreaded symbols to produce a sequence of demodulated symbols;

a deinterleaver for deinterleaving the sequence of demodulated symbols to produce a sequence of deinterleaved symbols;

a channel decoder for decoding the sequence of deinterleaved symbols to produce decoded data.

16. The apparatus of claim 13 wherein the equalizer generates the equalized data symbol sequence by inversing a channel frequency response.

17. The apparatus of claim 13 wherein the equalizer generates the equalized data symbol sequence by minimizing a mean square of an equalization error.

* * * * *